United States Patent
Shimizu

(10) Patent No.: US 8,803,517 B2
(45) Date of Patent: Aug. 12, 2014

(54) MAGNETIC-FIELD ANALYZING APPARATUS AND MAGNETIC-FIELD ANALYZING PROGRAM

(75) Inventor: Koichi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 12/801,604

(22) Filed: Jun. 16, 2010

(65) Prior Publication Data

US 2010/0321013 A1    Dec. 23, 2010

(30) Foreign Application Priority Data

Jun. 23, 2009    (JP) ................................ 2009-148993

(51) Int. Cl.
*G01R 33/02*    (2006.01)
(52) U.S. Cl.
USPC .......................................................... 324/244
(58) Field of Classification Search
USPC .......................................................... 324/244
See application file for complete search history.

(56) References Cited

U.S. PATENT DOCUMENTS 7,236,899 B1 * 6/2007 Shimizu .......................... 702/66

FOREIGN PATENT DOCUMENTS

| JP | 11-53422 | 2/1999 |
|---|---|---|
| JP | 2002-329624 | 11/2002 |
| JP | 2004-326630 | 11/2004 |
| JP | 2006-018393 | 1/2006 |
| JP | 2007-213384 | 8/2007 |
| JP | 2010-72711 | 4/2010 |

OTHER PUBLICATIONS

G. Hrkac et al. "Three-dimensional micromagnetic finite element simulations including eddy elements"; Journal of Applied Physics 97, 10E311 (2005); (3pgs).
D.R. Fredkin et al. "Hybrid Method for Computing Demagnetizing Fields"; IEEE Transactions of Magnetics, vol. 26, No. 2, Mar. 1990; (pp. 415-417).
Japanese Office Action issued Jun. 18, 2013 for corresponding Japanese Application No. 2009-148993.
European Search Report mailed Nov. 14, 2013 in application No. 10166724.4.
G. Hrkac et al. "Three-dimensional micromagnetic finite element simulations including eddy currents" Journal of Applied Physics, 2005, 3 pages.
G. Hrkac et al. "A combined vector and scalar potential method for 3D magnetic fields and transient Eddy current effects in recording head coils" Science Direct, 2006, 3 pages.

* cited by examiner

*Primary Examiner* — Reena Aurora
(74) *Attorney, Agent, or Firm* — Staas & Halsey LLP

(57) ABSTRACT

A first equation is created, using the physical property data of a user-specified target to be analyzed, to calculate a first magnetic field due to a current vector in the target to be analyzed in such a manner that a finite element method and a boundary integral method are applicable to the first equation. A second equation is created, using the physical property data of the user-specified target to be analyzed, to calculate a second magnetic field due to a magnetization vector in the target to be analyzed in such a manner that the finite element method and the boundary integral method are applicable to the second equation. A first magnetic field and a second magnetic field are calculated using the first equation and the second equation, respectively. The sum of the first magnetic field and the second magnetic field is set to the magnetic field of the target.

2 Claims, 7 Drawing Sheets

FIG.5A
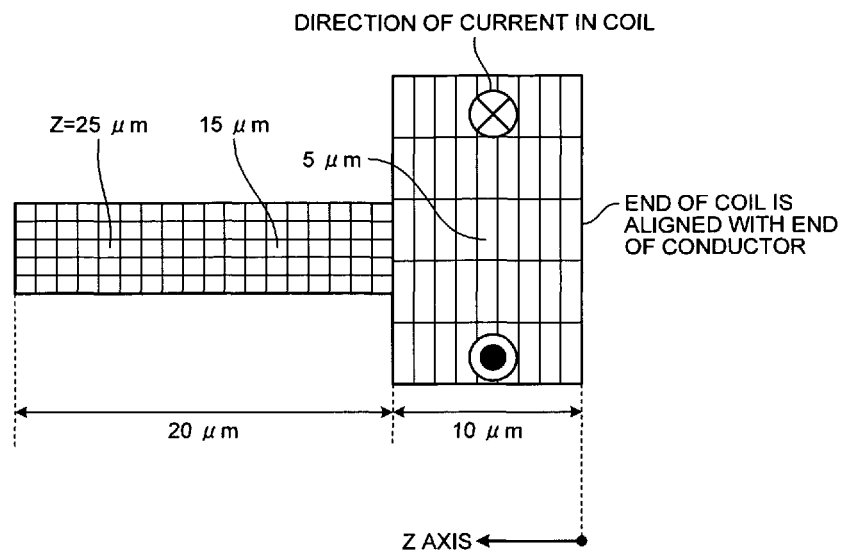
FIG.5B
| ELEMENT | MAGNETIC PERMEABILITY | CONDUCTIVITY [/Ωm] | CURRENT [A] | MAGNETIZATION VECTOR [T] |
|---|---|---|---|---|
| A | 1 | $1.0 \times 10^7$ | 0.0 | 0.0 |
| B | 1 | $1.0 \times 10^7$ | 1.0 | 0.0 |
FIG.5C
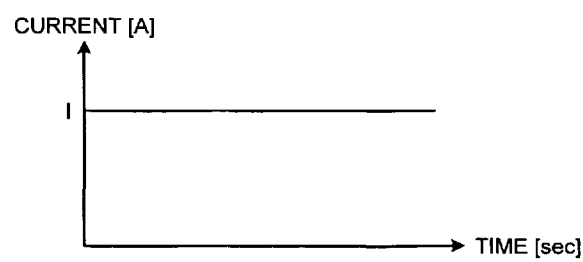

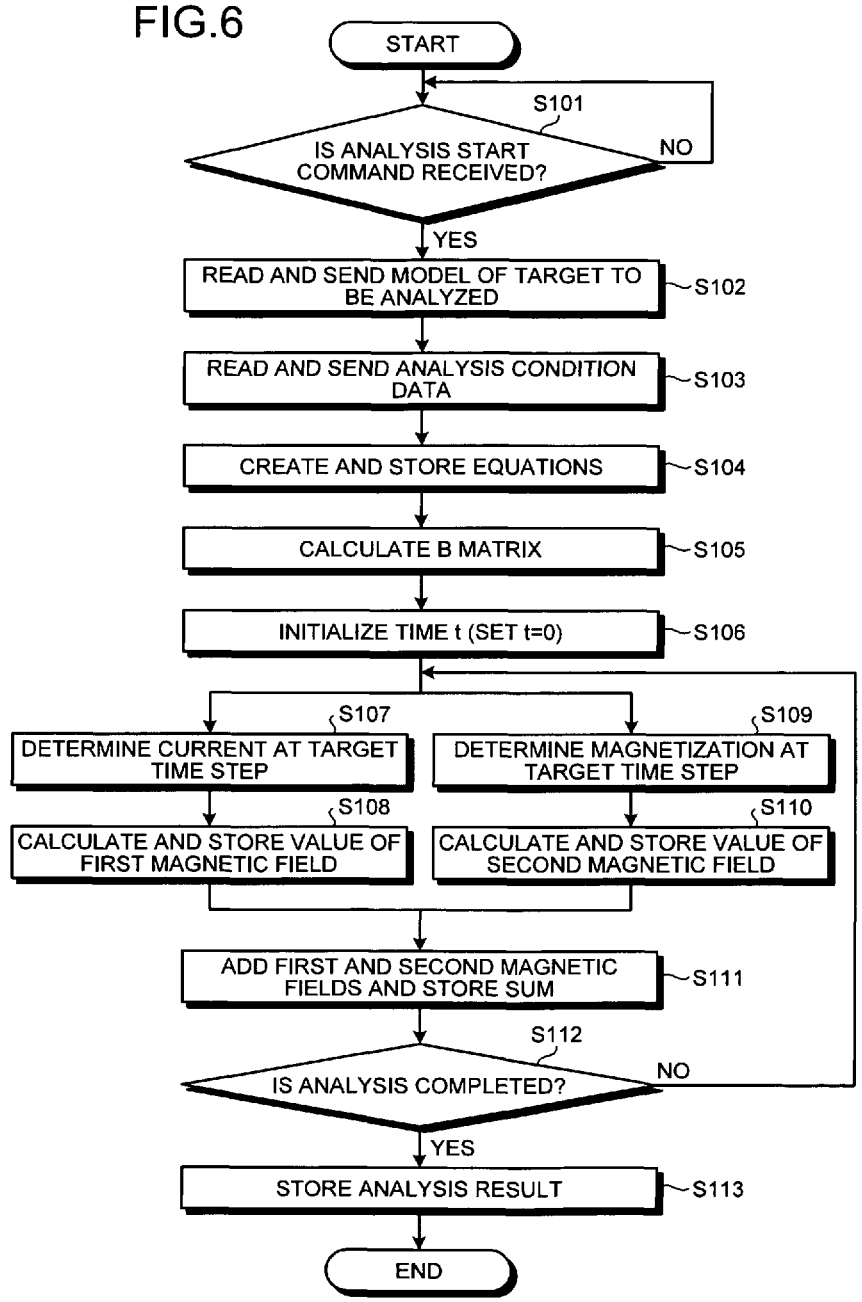

MAGNETIC-FIELD ANALYZING APPARATUS AND MAGNETIC-FIELD ANALYZING PROGRAM

CROSS-REFERENCE TO RELATED APPLICATION(S)

This application is based upon and claims the benefit of priority of the prior Japanese Patent Application No. 2009-148993, filed on Jun. 23, 2009, the entire contents of which are incorporated herein by reference.

FIELD

The embodiments discussed herein are directed to a magnetic-field analyzing apparatus and a magnetic-field analyzing program.

BACKGROUND

During the process of designing electromagnetic components, such as the head or the motor of a magnetic recording device, a magnetic-field simulation is conducted to analyze the magnetic fields generated around any magnetic bodies, conductors, etc. In the magnetic-field simulation, a region to be analyzed is divided into small domains (hereinafter, "meshes") and various equations are created to determine the magnetization state of each individual mesh. The behavior of the whole electromagnetic component when it is in a state of magnetization is predicted by solving the various created equations for the meshes as a set of simultaneous equations. A numerical analytical approach, such as the finite element method, is used to create and solve the simultaneous equations.

In an analysis according to the above-described numerical analytical approach using the finite element method, even spaces between the magnetic bodies and the conductors are divided into meshes. Various equations are then created to determine the magnetization states of the meshes in the interspaces. These equations, including the equations for the interspaces, are solved as a set of simultaneous equations. Accordingly, in the analysis according to the above-described numerical analytical approach using the finite element method, if the interspaces are deformed in accordance with movement of the magnetic bodies and the conductors, it is necessary to create new equations in accordance with the deformation and solve the new equations as a set of simultaneous equations. Such an analysis may take a long time.

The boundary element method is a well-known numerical analytical approach to magnetic-field simulation in which, even when the interspaces are deformed in accordance with movement of the magnetic bodies and the conductors, mesh generation of the deformed interspaces is not needed (see, for example, Japanese Laid-open Patent Publication No. 2006-18393 and Japanese Laid-open Patent Publication No. 2007-213384). More particularly, a numerical analytical approach using the boundary element method is a combination of the finite element method and the boundary element method. The magnetization state is analyzed where the individual magnetic bodies are moving in arbitrary directions. However, in the analysis according to the numerical analytical approach using the boundary element method, it is necessary to solve many simultaneous equations. Such an analysis may take a long time.

A numerical analytical approach using both the boundary integral method and the finite element method is known that does not need many simultaneous equations and thus can be used to efficiently simulate a magnetic field.

In an analysis according to this numerical analytical approach using both the boundary integral method and the finite element method, magnetic fields due to magnetization vectors in a magnetic body or similar and magnetic fields due to current vectors in a conductor or similar are calculated individually using the finite element method and the boundary integral method. An analysis method is known that analyzes the magnetization state using the calculated individual magnetic fields (see, for example, "Hybrid method for computing demagnetizing fields" IEEE transactions on Magnetics, vol. 26, No. 2, March (1990)). However, in an analysis according to the above-described numerical analytical approach, because scalar potentials are used to calculate the magnetic fields due to the magnetization vectors, it is impossible to take eddy currents into consideration that are caused by changes in relative positions between the magnetic bodies or caused by changes in the current over time.

Another numerical analytical approach using both the boundary integral method and the finite element method is known that takes the eddy currents into consideration (see, for example, "Three-dimensional micromagnetic finite element simulations including eddy currents", J. Appl. Phys. 97, 10E311 (2005)).

However, in the analysis according to the above-described conventional technology, the effects of the magnetization vectors upon the magnetic field cannot be accurately considered. In the analysis according to the above-described conventional technology, the magnetic fields due to the current vectors in the conductor or similar are analyzed using the finite element method and the boundary integral method; however, the finite element method and the boundary integral method are not applicable to the equations that contain the magnetization vectors due to the magnetic body or similar. Therefore, the effects of the magnetization vectors upon the magnetic field cannot be accurately considered.

More particularly, in order to apply the finite element method and the boundary integral method to an equation, it is necessary to transform volume integrals on both sides of the equation into surface integrals; however, for the equations that contain the magnetization vectors, it is impossible to transform volume integrals into surface integrals. Therefore, the finite element method and the boundary integral method are not applicable to the equations that describe the magnetization vectors. As a result, in the analysis according to the above-described conventional technology, the effects of the magnetization vectors upon the magnetic field cannot be accurately considered.

SUMMARY

According to an aspect of an embodiment of the invention, a magnetic-field analyzing apparatus includes an input unit that receives physical property data of a target to be analyzed; an equation creating unit that creates, using the physical property data received from the input unit, a first equation to calculate a first magnetic field due to a current vector in the target to be analyzed and a second equation to calculate a second magnetic field due to a magnetization vector in the target to be analyzed in such a manner that a finite element method and a boundary integral method are applicable to both the first equation and the second equation; and a magnetic-field calculating unit that calculates the first magnetic field using the equations created by the equation creating unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIGS. 5A to 5C are schematic diagrams that explain analysis condition data;

FIG. 6 is a flowchart of a magnetic-field analyzing process performed by the magnetic-field analyzing apparatus according to the second embodiment;

DESCRIPTION OF EMBODIMENTS

Preferred embodiments of the present invention will be explained with reference to accompanying drawings. In the following section, some embodiments of the magnetic-field analyzing apparatus and the magnetic-field analyzing program according to the present invention are described.

[a] First Embodiment

Figure 1:
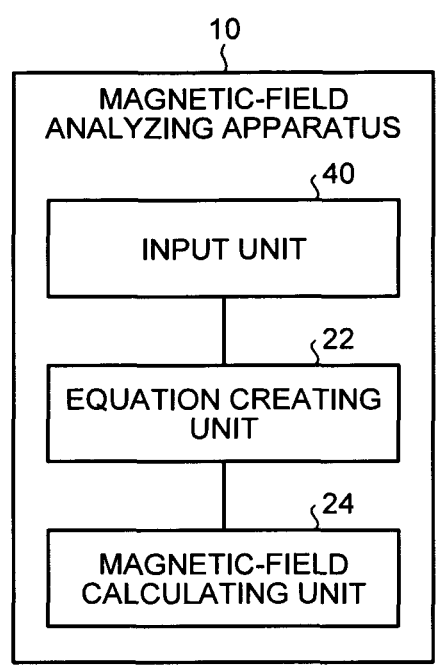
FIG. 1 is a block diagram of the configuration of a magnetic-field analyzing apparatus according to the first embodiment.

The configuration of a magnetic-field analyzing apparatus according to a first embodiment is described below with reference to FIG. 1. FIG. 1 is a block diagram of the configuration of a magnetic-field analyzing apparatus according to the first embodiment.

As illustrated in FIG. 1, a magnetic-field analyzing apparatus 10 according to the first embodiment includes an equation creating unit 22, a magnetic-field calculating unit 24, and an input unit 40.

The input unit 40 receives physical property data of a target to be analyzed.

The equation creating unit 22 creates, on the basis of the physical property data of the target to be analyzed that are received from the input unit 40, a first equation in the form solvable using the finite element method and the boundary integral method. The first equation is used to calculate a first magnetic field due to current vectors in the target to be analyzed.

The equation creating unit 22 creates, on the basis of the physical property data of the target to be analyzed that are received from the input unit 40, a second equation in the form solvable using the finite element method and the boundary integral method. The second equation is used to calculate a second magnetic field due to magnetization vectors in the target to be analyzed.

The magnetic-field calculating unit 24 calculates the first magnetic field and the second magnetic field using the equations created by the equation creating unit 22.

Effects of the First Embodiment

As described above, in the first embodiment, the input unit 40 receives the physical property data of the target to be analyzed. The equation creating unit 22 creates, on the basis of the physical property data of the target to be analyzed that are received from the input unit 40, the first equation in the form solvable using the finite element method and the boundary integral method. The first equation is used to calculate the first magnetic field due to current vectors in the target to be analyzed. The equation creating unit 22 creates, on the basis of the physical property data of the target to be analyzed that are received from the input unit 40, the second equation in the form solvable using the finite element method and the boundary integral method. The second equation is used to calculate the second magnetic field due to magnetization vectors in the target to be analyzed. The magnetic-field calculating unit 24 calculates the first magnetic field and the second magnetic field using the first equation and the second equation, which are created by the equation creating unit 22, respectively. Therefore, the equation that contains the magnetization vectors can be transformed from the volume integral equation into the surface integral equation. As a result, the finite element method and the boundary integral method are applicable to the equation that contains the magnetization vectors, which makes it possible to analyze the magnetic field accurately with the effects of the magnetization vectors being taken into consideration.

[b] Second Embodiment

A process performed by the magnetic-field analyzing apparatus 10 according to the first embodiment is described in detail below.

Figure 2:
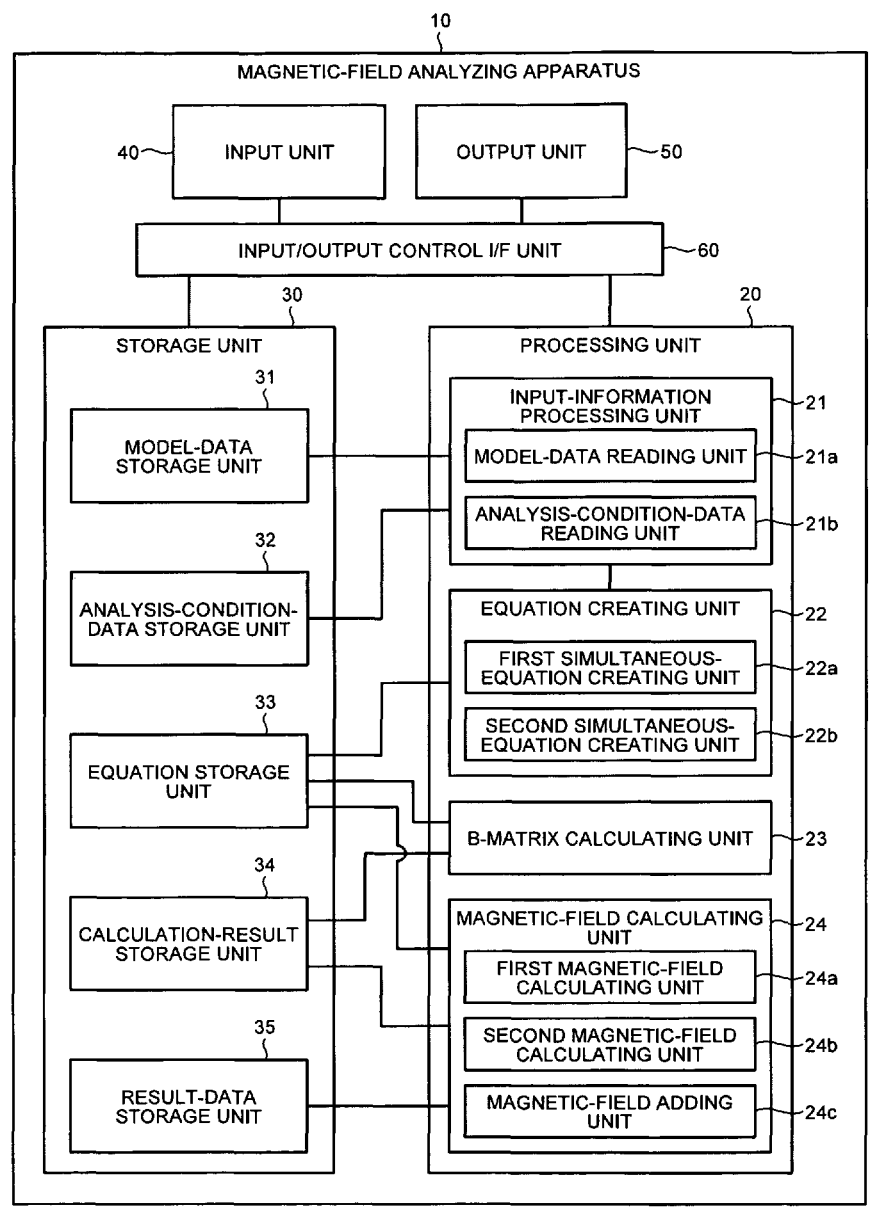
FIG. 2 is a block diagram of the configuration of a magnetic-field analyzing apparatus according to the second embodiment.
Figure 3:
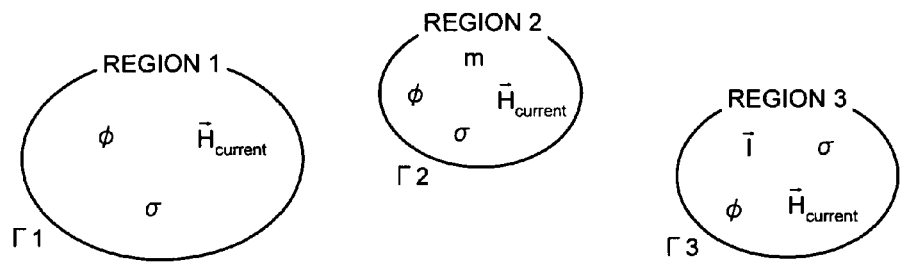
FIG. 3 is a schematic diagram that explains the outline of a numerical analytical approach.
Figure 4:
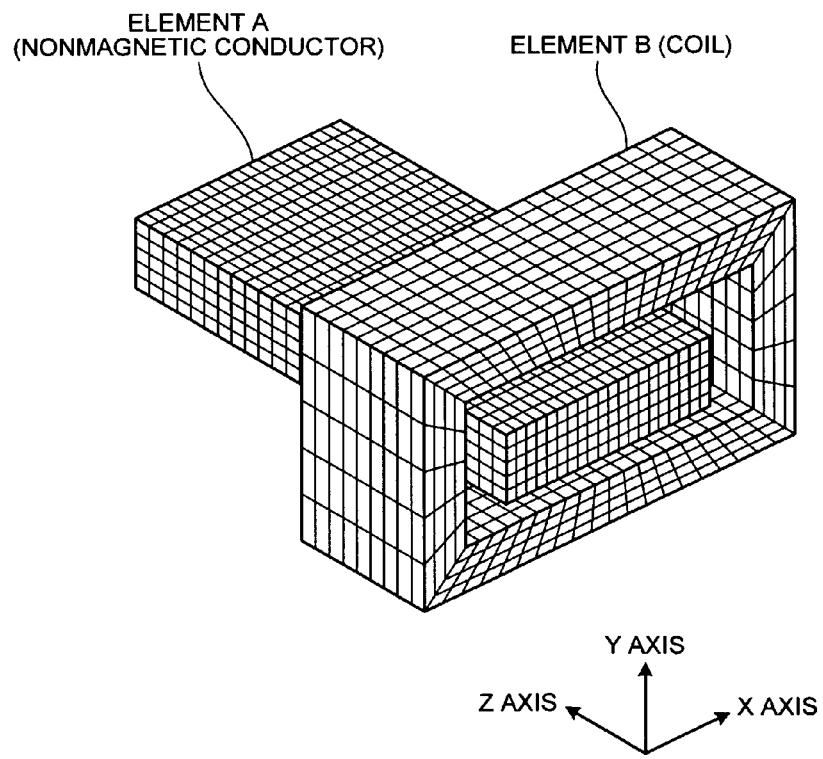
FIG. 4 is a perspective view of a model of a target to be analyzed.

Configuration of the Magnetic-Field Analyzing Apparatus According to the Second Embodiment The configuration of a magnetic-field analyzing apparatus according to the second embodiment is described below with reference to FIGS. 2 to 4 and 5A to 5C. FIG. 2 is a block diagram of the configuration of the magnetic-field analyzing apparatus according to the second embodiment. FIG. 3 is a schematic diagram that explains the outline of a numerical analytical approach according to the second embodiment. FIG. 4 is a perspective view of a model of a target to be analyzed. FIGS. 5A to 5C are schematic diagrams that explain analysis condition data.

As illustrated in FIG. 2, the magnetic-field analyzing apparatus 10 according to the second embodiment includes a processing unit 20, a storage unit 30, the input unit 40, an output unit 50, and an input/output control I/F unit 60.

The input unit 40 includes a keyboard, a mouse, or the like. The input unit 40 receives various data from a user. The input unit 40 receives, for example, data about the target to be analyzed and data about analysis conditions from the user and sends the received data about the target to be analyzed and the received data about analysis conditions to the later-described processing unit 20 and the later-described storage unit 30.

The output unit 50 includes a monitor or the like. The output unit 50 outputs a later-described processing result that is obtained by the processing unit 20 on the monitor.

The input/output control I/F unit 60 is an interface that sends/receives data to/from the processing unit 20, the storage unit 30, the input unit 40, and the output unit 50.

The processing unit 20 analyzes the magnetization state of the target to be analyzed using data stored in the storage unit 30. The analysis performed by the processing unit 20 using data stored in the storage unit 30 is described in detail below with equations.

The numerical analytical approach for the magnetic-field analysis according to the present embodiment is described below. In analysis using the numerical analytical approach used in the present embodiment, the magnetization state of the whole target device is analyzed by dividing only regions of conductors or magnetic bodies included in the target device are divided into meshes, without dividing the interspaces into meshes. In analysis using the numerical analytical approach used in the present embodiment, as illustrated in FIG. 3 for example, the magnetization state of a set of three regions 1 to 3 that are spaced away from each other is analyzed by dividing only three regions 1 to 3 into meshes. The vector $H_{current}$ illustrated in FIG. 3 indicates a magnetic field due to current; $\phi$ is the scalar potential; $\sigma$ is the conductivity; the vector m is the magnetization vector; and the vector I is the current vector. The region 1 illustrated in FIG. 3 is a conductor; the region 2 is a conductor that has the magnetization vector; and the region 3 is a conductor that has the current vector. $\Gamma 1$ is the outer-most circumferential surface of the region 1; $\Gamma 2$ is the outer-most circumferential surface of the region 2; and $\Gamma 3$ is the outer-most circumferential surface of the region 3. A total outer circumferential surface $\Gamma$ is expressed by "$\Gamma 1+\Gamma 2+\Gamma 3$".

The numerical analytical approach using both the finite element method and the boundary integral method that is performed by the processing unit 20 according to the present embodiment (hereinafter, "finite element-boundary integral method") is described below with equations that contain the symbols or the like illustrated in FIG. 3. In the following paragraphs, equations used in an analysis method unsupported by the present embodiment are described first, and then equations used in the analysis method according to the present embodiment are described.

The analysis method using the finite element-boundary integral method unsupported by the present embodiment involves calculating a magnetic field due to a magnetization vector using the scalar potential and calculating a magnetic field due to a current vector using the vector $H_{current}$, thereby calculating the magnetic fields of the three regions. In the calculation using the scalar potential, the following Equations (1) to (5) are obtained by applying the finite element-boundary integral method to the three regions:

$$\phi = \phi_1 + \phi_2 \tag{1}$$

$$\Delta \phi_1 = -\vec{\nabla} \cdot \vec{m} \tag{2}$$

$$\phi_2(x) = \frac{1}{4\pi} \oint \frac{\phi_1(X)(\vec{x} - \vec{X})}{|x - X|} \vec{n} d\Gamma \tag{3}$$

$$\Delta \phi_2 = 0 \tag{4}$$

$$H = -\nabla(\phi_1 + \phi_2) \tag{5}$$

Equation (1) is used to separate $\phi$ into $\phi_1$ and $\phi_2$ in order to use the finite element-boundary integral method applicable. Equation (2) is a Poisson's equation that contains a term depending on the magnetization vector. Equation (3) is used to calculate the boundary value of $\phi_2$ using the boundary integral of $\phi_1$. Equation (4) is a Laplace's equation with $\phi_2$ being set as an unknown. Equation (5) is used to calculate the magnetic field using the gradient of the scalar potential.

The stationary magnetic field due to the magnetization vector is calculated by solving Equations (2) to (5) in sequence.

In the calculation using the vector $H_{current}$ the following Equations (6) to (9) are obtained by applying the finite element-boundary integral method to the above three regions:

$$\Delta \vec{H}_1 = -\vec{\nabla} \times \vec{I} \tag{6}$$

$$\vec{H}_2(x) = \frac{1}{4\pi} \oint \frac{\vec{H}_1(X)(\vec{x} - \vec{X})}{|x - X|} \vec{n} d\Gamma \tag{7}$$

$$\Delta \vec{H}_2 = 0 \tag{8}$$

$$\vec{H}_{current} = H_1 + H_2 \tag{9}$$

Equation (6) is a Poisson's equation with a term depending on the current vector on the right side. Equation (7) is a boundary integral equation that is used to calculate the boundary value of $H_2$ using the boundary integral of $H_1$. Equation (8) is a Laplace's equation of $H_2$. Equation (9) is used to calculate the magnetic field due to the current using the sum of the magnetization vectors. The magnetic field due to the current vectors is calculated by solving Equations (6) to (9) in sequence. It is noted that H is separated into $H_1$ and $H_2$ in order to use the finite element-boundary integral method. Equations (3) and (7) can be rewritten to the following equations (10) and (11), respectively. Equations (10) and (11) can be transformed, in terms of the unknown nodal point, into the following equations (12) and (13), respectively.

$$\phi_2(x) = B(x,X)\phi_1(X) \tag{10}$$

$$H_2(x) = B(x,X)H_1(X) \tag{11}$$

$$\phi_{2,i} = B_{ij}\phi_{1,j} \tag{12}$$

$$H_{2,i} = B_{ij}H_{1,j} \tag{13}$$

Using the transformed equations that contain $B_{ij}$, the nodal point or the unknown can be calculated in a simpler manner. $B_{ij}$ is called, herein, "B matrix".

However, even when the above-described calculation method is taken, the magnetic field is analyzed without consideration of transient effects, such as eddy currents that are caused by changes in relative positions between the magnetic bodies or caused by changes in the current over time. In analysis using another analysis method that takes transient effects into consideration, the following Equation (14) is used. The vector $H_{eddy}$ in Equation (14) is the magnetic field due to the eddy current.

$$\Delta \vec{H}_{eddy} = \sigma\mu \frac{\partial \vec{H}_{eddy}}{\partial t} + \sigma \frac{\partial \vec{m}}{\partial t} - \vec{\nabla} \times \vec{I} \tag{14}$$

However, in the magnetic-field analysis using Equation (14), because the volume integrals containing the magnetization vectors on both sides cannot be transformed to the surface integrals, the finite element-boundary integral method is not applicable; therefore, the effects of the magnetization vectors upon the magnetic field cannot be accurately considered.

In the analysis using the numerical analytical method according to the present embodiment, in order to apply the finite element-boundary integral method to Equation (14), the following Equation (15) is created by deleting the term of the magnetization vectors from Equation (14):

$$\Delta \vec{H}_{current} = \sigma\mu \frac{\partial \vec{H}_{current}}{\partial t} - \vec{\nabla} \times \vec{I} \tag{15}$$

After that, by applying the finite element-boundary integral method to Equation (15), the following Equations (16) to (19) are obtained:

$$\left(\frac{\sigma\mu}{\Delta t} - \Delta\right)\vec{H}_{current,1}^{n+1} = \frac{\sigma\mu}{\Delta t}\vec{H}_{current,1}^{n} + \vec{\nabla} \times \vec{I}^n \tag{16}$$

$$\vec{H}_{current,2}^{n+1}(x) = \frac{1}{4\pi} \oint \frac{\vec{H}_{current,1}^{n+1}(X)(\vec{x}-\vec{X})}{|x-X|} \vec{n} d\Gamma \tag{17}$$

$$\left(\frac{\sigma\mu}{\Delta t} - \Delta\right)\vec{H}_{current,2}^{n+1} = \frac{\sigma\mu}{\Delta t}\vec{H}_{current,2}^{n} \tag{18}$$

$$\vec{H}_{current}^{n+1} = H_1^{n+1} + H_2^{n+1} \tag{19}$$

By solving Equations (16) to (19) in sequence, the transient magnetic field due to the current vectors at "Time: n+1" is calculated. It is noted that "n" is the current step of time, and "n+1" is the next step of time to be calculated. Although the implicit method is used as a temporal solution in the above explanation, some other methods, such as an explicit method, can be used.

After that, in analysis using the numerical analytical method according to the present embodiment, in terms of the magnetization vector that is deleted from Equation (14) to develop Equation (15), a finite element-boundary integral method applicable equation is developed from the following equation (20) that contains the vector potential as an unknown:

$$\vec{\nabla} \times \frac{1}{\mu} \vec{\nabla} \times \vec{A} = -\sigma \frac{\partial \vec{A}}{\partial t} + \frac{1}{\mu_0} \vec{\nabla} \times \vec{m} \tag{20}$$

In Equation (20), "A" is the vector potential, and "μ" is the magnetic permeability.

If, in Equation (20), the magnetic permeability of air is assumed to 1, because the magnetic permeability $\mu_0$ is fixed in the air, $\mu_0$ is excluded from the rotation. Equation (20) is then transformed into Equation (21) using a vector formula and a Coulomb gauge ($\vec{\nabla}\cdot\vec{A}=0$), and then Equation (22) is obtained. The assumption that "the magnetic permeability of air is 1" indicates that the magnetic body is expressed by the magnetization vector.

$$\frac{1}{\mu_0}\vec{\nabla} \times \vec{\nabla} \times \vec{A} = \frac{1}{\mu_0}\vec{\nabla}(\vec{\nabla}\cdot\vec{A}) - \frac{1}{\mu_0}\vec{\nabla}^2\vec{A} = -\frac{1}{\mu_0}\vec{\nabla}^2\vec{A} \tag{21}$$

$$\vec{\nabla}^2 \vec{A} = \mu_0 \sigma \frac{\partial \vec{A}}{\partial t} - \vec{\nabla} \times \vec{m} \tag{22}$$

By transforming Equation (20) into the Poisson's equation, i.e., Equation (22), it is possible to use the finite element-boundary integral method.

After that, by applying the finite element-boundary integral method and the implicit method to Equation (22), the following Equations (23) to (27) are obtained:

$$\left(\frac{\sigma\mu}{\Delta t} - \Delta\right)\vec{A}_1^{n+1} = \frac{\sigma\mu}{\Delta t}\vec{A}_1^{n} + \vec{\nabla} \times \vec{m}^n \tag{23}$$

$$\vec{A}_2^{n+1}(x) = \frac{1}{4\pi} \oint \frac{\vec{A}_1^{n+1}(X)(\vec{x}-\vec{X})}{|x-X|} \vec{n} d\Gamma \tag{24}$$

$$\left(\frac{\sigma\mu}{\Delta t} - \Delta\right)\vec{A}_2^{n+1} = \frac{\sigma\mu}{\Delta t}\vec{A}_2^{n} \tag{25}$$

$$\vec{B}^{n+1} = \vec{\nabla} \times \left(\vec{A}_1^{n+1} + \vec{A}_2^{n+1}\right) \tag{26}$$

$$\vec{H}_{mag}^{n+1} = \frac{1}{\mu_0}\left(\vec{B}^{n+1} - \vec{m}\right) \tag{27}$$

Equations (15) and (24) can be rewritten to Equations (11) and (28), respectively. Equations (11) and (28) can be transformed, in terms of the unknown nodal point, into Equations (13) and (29), respectively, each containing the B matrix.

$$A_2(x) = B(x,X)A_1(X) \tag{28}$$

$$A_{2,i} = B_{ij}A_{1,j} \tag{29}$$

By solving Equations (23) to (27) in sequence, the magnetic field due to the magnetization vectors at the time "n+1" is calculated. Although the implicit method is used as a temporal solution in the above explanation, some other methods, such as the explicit method, can be used.

The magnetization state of the whole target device is analyzed using the following equation (30) that is calculated by combining Equations (19) and (27):

$$\vec{H}^{n+1} = \vec{H}_{current}^{n+1} + \vec{H}_{mag}^{n+1} \tag{30}$$

In this manner, the processing unit 20 of the magnetic-field analyzing apparatus 10 according to the present embodiment analyzes the magnetic field of the target device using Equations (15) to (30).

Referring back to FIG. 2, the storage unit 30 stores therein the model of the target to be analyzed, the analysis condition data, the above equations, and a later-described processing result obtained by the processing unit 20. The storage unit 30 includes a model-data storage unit 31, an analysis-condition-data storage unit 32, an equation storage unit 33, a calculation-result storage unit 34, and a result-data storage unit 35.

The model-data storage unit 31 stores therein the model of the target to be analyzed that is received from the user via the input unit 40. More particularly, the model-data storage unit 31 stores therein a model of an electromagnetic device or similar that is subjected to the magnetic-field analysis in associated with the physical property data and the position of each element included in the electromagnetic device or similar. The model-data storage unit 31 stores therein, as the model of the target to be analyzed for example, a model of a device that is made up of an element A and an element B illustrated in FIG. 4. The element A is a nonmagnetic conductor and the element B is a coil. The region of each element is divided small domains (meshes). The model-data storage unit 31 stores therein three-dimensional information indicating shape and arrangement of each element included in the model of the target to be analyzed in the three-dimensional space (see, X, Y, and Z axes illustrated in FIG. 4). The size of each mesh is from several tens to several hundreds nanometers (nm). The size is set by the user.

The analysis-condition-data storage unit 32 stores therein the analysis condition data that has been received from the user via the input unit 40. The analysis condition data is used to analyze the model of the target device. More particularly, the analysis-condition-data storage unit 32 stores therein various parameters that are assigned to the model of the target to be analyzed in accordance with user instructions. For example, as illustrated in FIG. 5A, the analysis-condition-data storage unit 32 stores therein parameters that are used to analyze the model of the target device, such as "the direction of the current in the coil", "the end of the coil is aligned with the end of the conductor", "Z-axial length of the coil: 10 μm", "Z-axial length of the conductor: 30 μm=20 μm+10 μm".

The analysis-condition-data storage unit 32 stores therein, for example, parameters indicative of "analysis positions: Z=25 μm, 15 μm, and 5 μm" illustrated in FIG. 5A. The analysis-condition-data storage unit 32 stores therein, for example, parameters indicative of "element name A, magnetic permeability 1, conductivity $1.0\times10^7$, current 0.0, magnetization 0.0" and "element name B, magnetic permeability 1, conductivity $1.0\times10^7$, current 1, magnetization 0.0" illustrated in FIG. 5B.

The current and the magnetization are set appropriately with respect to the elapsed time from the analysis starting time. For example, the current having a fixed value I [A] with respect to the time [sec] illustrated in FIG. 5C is set.

The equation storage unit 33 stores therein equations that are used by the later-described processing unit 20 and equations created by the later-described processing unit 20. The equations stored in the equation storage unit 33 will be described later.

The calculation-result storage unit 34 stores therein calculation results that are calculated by the later-described processing unit 20. The result-data storage unit 35 stores therein analysis results that are obtained by the later-described processing unit 20. The calculation results and the analysis results will be described later.

The processing unit 20 receives the target to be analyzed and the analysis condition data from the input unit 40, performs a magnetic-field analyzing processes using the received information. The processing unit 20 includes an input-information processing unit 21, the equation creating unit 22, a B-matrix calculating unit 23, and the magnetic-field calculating unit 24.

The input-information processing unit 21 reads the model of the target to be analyzed and the analysis condition data from the storage unit 30 and sends the read data to the later-described equation creating unit 22. The input-information processing unit 21 includes a model-data reading unit 21a and an analysis-condition-data reading unit 21b.

The model-data reading unit 21a reads the model of the user-specified target to be analyzed from the model-data storage unit 31 and sends the read model of the target to be analyzed to the later-described equation creating unit 22.

The analysis-condition-data reading unit 21b reads the use-specified parameters of the analysis condition data from the analysis-condition-data storage unit 32 and sends the read analysis condition data to the later-described equation creating unit 22.

The equation creating unit 22 creates, using the model of the target to be analyzed and the analysis condition data received from the input-information processing unit 21, equations that are used to analyze the magnetic field of the model of the target to be analyzed. The equation creating unit 22 includes a first simultaneous-equation creating unit 22a and a second simultaneous-equation creating unit 22b.

The first simultaneous-equation creating unit 22a creates, using the physical property data of the model of the target to be analyzed received from the model-data reading unit 21a, the first equation to calculate the first magnetic field due to the current vector in the target to be analyzed. More particularly, in order to calculate the first magnetic field due to the current vector in the conductor of the model of the target to be analyzed, the first simultaneous-equation creating unit 22a creates, using Equation (14) that is stored in the equation storage unit 33, Equation (15) for the model of the target to be analyzed received from the model-data reading unit 21a.

The first simultaneous-equation creating unit 22a creates a set of first simultaneous equations by applying both the finite element-boundary integral method and the implicit method or the explicit method to the first equation in accordance with change over time in relative positions between the elements included in the model of the target to be analyzed. The first simultaneous-equation creating unit 22a stores the created first simultaneous equations in the equation storage unit 33.

For example, the first simultaneous-equation creating unit 22a creates Equations (16) to (19) by applying both the finite element-boundary integral method and the implicit method to Equation (15) and stores the created Equations (16) to (19) in the equation storage unit 33.

The second simultaneous-equation creating unit 22b creates, using the physical property data of the model of the target to be analyzed received from the model-data reading unit 21a, the second equation to calculate the second magnetic field due to the magnetization vector in the target to be analyzed. More particularly, in order to calculate the second magnetic field due to the magnetization vector in the magnetic body of the model of the target to be analyzed, the second simultaneous-equation creating unit 22b creates, using Equation (14) that is stored in the equation storage unit 33, Equation (22) for the model of the target to be analyzed received from the model-data reading unit 21a.

The second simultaneous-equation creating unit 22b creates a set of second simultaneous equations by applying both the finite element-boundary integral method and the implicit method or the explicit method to the second equation in accordance with change over time in relative positions between the elements included in the model of the target to be analyzed. The second simultaneous-equation creating unit 22b stores the created second simultaneous equations in the equation storage unit 33.

For example, the second simultaneous-equation creating unit 22b creates Equations (23) to (27) by applying both the finite element-boundary integral method and the implicit method to Equation (22) and stores the created Equations (23) to (27) in the equation storage unit 33.

The B-matrix calculating unit 23 receives the model of the target to be analyzed from the model-data reading unit 21a and the analysis conditions from the analysis-condition-data reading unit 21b. The B-matrix calculating unit 23 calculates the strain matrix (hereinafter, "B matrix") at each nodal point of successive regions included in the received mesh-divided model of the target to be analyzed in accordance with the received analysis conditions.

The magnetic-field calculating unit 24 solves the first simultaneous equations and the second simultaneous equations stored in the equation storage unit. The magnetic-field calculating unit 24 includes a first magnetic-field calculating unit 24a, a second magnetic-field calculating unit 24b, and a magnetic-field adding unit 24c.

The first magnetic-field calculating unit 24a calculates the time-series first magnetic field by solving the first simultaneous equations stored in the equation storage unit 33 and stores the calculation result in the calculation-result storage unit 34. For example, the first magnetic-field calculating unit 24a solves Equations (16) to (19), which are stored in the equation storage unit 33, in sequence, thereby calculating the time-series first magnetic field and stores the calculation result in the calculation-result storage unit 34.

The second magnetic-field calculating unit 24b calculates the time-series second magnetic field by solving the second simultaneous equations stored in the equation storage unit 33 and stores the calculation result in the calculation-result storage unit 34. For example, the second magnetic-field calculating unit 24b solves Equations (23) to (27), which are stored in the equation storage unit 33, in sequence, thereby calculating the time-series second magnetic field and stores the calculation result in the calculation-result storage unit 34.

The magnetic-field adding unit 24c adds the calculation result of the first magnetic field and the calculation result of the second magnetic field, both stored in the calculation-result storage unit 34, stores the sum in the result-data storage unit 35 as the analysis result, and sends the analysis result to the output unit 50 via the input/output control I/F unit 60. For example, the magnetic-field adding unit 24c adds the first magnetic field and the second magnetic field using Equation (30), which is stored in the equation storage unit 33, thereby obtaining the analysis result, stores the analysis result in the result-data storage unit 35, and sends the analysis result to the output unit 50 via the input/output control I/F unit 60.

Equations (19), (26), and (27), which are stored in the equation storage unit 33, can be used in another analysis that is made after Equations (19), (26), and (27) have been stored. In other words, it is possible to make an analysis using already created equations, without creating new equations for each analysis.

Process Performed by the Magnetic-Field Analyzing Apparatus According to the Second Embodiment A process performed by the magnetic-field analyzing apparatus according to the second embodiment is described below with reference to FIG. 6. FIG. 6 is a flowchart of a magnetic-field analyzing process performed by the magnetic-field analyzing apparatus according to the second embodiment.

As illustrated in FIG. 6, in the magnetic-field analyzing apparatus 10 according to the second embodiment, when an analysis start command is received from the user (Yes at Step S101), the model-data reading unit 21a reads the model of the target to be analyzed from the model-data storage unit 31 and sends the model of the target to be analyzed to the equation creating unit 22 (Step S102). More particularly, when the user specifies the model of the target to be analyzed and the analysis conditions, the model-data reading unit 21a reads the model of the target to be analyzed from the model-data storage unit 31. The model-data reading unit 21a then sends the read model of the target to be analyzed to the equation creating unit 22.

The analysis-condition-data reading unit 21b reads, from the analysis-condition-data storage unit 32, the analysis condition data corresponding to the model of the target to be analyzed that has been read by the model-data reading unit 21a and sends the analysis condition data to the equation creating unit 22 (Step S103).

The first simultaneous-equation creating unit 22a creates the first simultaneous equations to calculate the magnetic field due to the current vector and stores the first simultaneous equations in the equation storage unit 33 (Step S104). The second simultaneous-equation creating unit 22b creates the second simultaneous equations to calculate the magnetic field due to the magnetization vector and stores the second simultaneous equations in the equation storage unit 33 (Step S104).

After that, the B-matrix calculating unit 23 calculates the B matrix of the model of the target to be analyzed that has been received from the model-data reading unit 21a in accordance with the analysis conditions that have been received from the analysis-condition-data reading unit 21b (Step S105).

The first magnetic-field calculating unit 24a initializes "time t" of the first simultaneous equations that are stored in the equation storage unit 33 (sets t=0) (Step S106). The second magnetic-field calculating unit 24b initializes "time t" of the second simultaneous equations that are stored in the equation storage unit 33 (sets t=0) (Step S106).

After that, the first magnetic-field calculating unit 24a determines, in accordance with the analysis conditions specified by the user, the current at the target time step (Step S107), calculates the value of the first magnetic field at the target time step from the current time step, and stores the calculated value of the first magnetic field in the calculation-result storage unit 34 (Step S108).

In parallel to Step S107, the second magnetic-field calculating unit 24b determines, in accordance with the analysis conditions specified by the user, the magnetization at the target time step (Step S109). In parallel to Step S108, the second magnetic-field calculating unit 24b calculates the value of the second magnetic field at the target time step from the current time step, and stores the calculated value of the second magnetic field in the calculation-result storage unit 34 (Step S110).

After that, the magnetic-field adding unit 24c adds the calculation result of the first magnetic field and the calculation result of the second magnetic field, both stored in the calculation-result storage unit 34, and stores the sum in the calculation-result storage unit 34 (Step S111). The magnetic-field adding unit 24c determines whether the analysis is made at every time step within the user-specified range (Step S112).

If the analysis is not made at one time step (No at Step S112), the process control returns to Steps S107 and S108 and the first magnetic-field calculating unit 24a determines the current at the next time step and the second magnetic-field calculating unit 24b determines the magnetization at the next time step.

If the analysis is made at every time step (Yes at Step S112), the magnetic-field adding unit 24c stores the analysis results in the result-data storage unit 35 (Step S113) and the process control goes to end.

Effects of the Second Embodiment

In the second embodiment, as described above, the input unit 40 receives the physical property data of the target to be analyzed. The first simultaneous-equation creating unit 22a creates, using the physical property data of the target to be analyzed received from the input unit 40, the finite element-boundary integral method applicable first equation to calculate the first magnetic field due to the current vector in the target to be analyzed. The second simultaneous-equation creating unit 22b creates, using the physical property data of the target to be analyzed received from the input unit 40, the finite element-boundary integral method applicable second equation to calculate the second magnetic field due to the magnetization vector in the target to be analyzed. After that, the first magnetic-field calculating unit 24a calculates the first magnetic field using the equations created by the first simultaneous-equation creating unit 22a. The second magnetic-field calculating unit 24b calculates the second magnetic field using the equations created by the second simultaneous-equation creating unit 22b. Therefore, the finite element-boundary integral method is applicable to the equation containing the magnetization vector, which makes it possible to analyze the magnetic field accurately with the effects of the magnetization vectors upon the magnetic field being taken into consideration.

Moreover, in the second embodiment, the input unit 40 receives position information of elements included in the target to be analyzed. By applying the implicit method or the explicit method to the first equation in accordance with change over time in relative positions between the elements included in the target to be analyzed, the first simultaneous-equation creating unit 22a further creates the first simultaneous equations to calculate the time-series value of the first magnetic field. The first magnetic-field calculating unit 24a calculates the first magnetic field using the equations created by the first simultaneous-equation creating unit 22a. The time-series analysis is made in this simple manner and the first magnetic field including the non-stationary magnetic field is calculated accurately in this simple manner with the effects of the current vectors being taken into consideration.

Furthermore, in the second embodiment, the input unit 40 receives position information of elements included in the target to be analyzed. By applying the implicit method or the explicit method to the second equation in accordance with change over time in relative positions between the elements included in the target to be analyzed, the second simultaneous-equation creating unit 22b further creates the second simultaneous equations to calculate the time-series value of the first magnetic field. The second magnetic-field calculating unit 24b calculates the second magnetic field using the equations created by the second simultaneous-equation creating unit 22b. The time-series analysis is made in this simple manner and the second magnetic field including the non-stationary magnetic field is calculated accurately in this simple manner with the effects of the magnetization vectors being taken into consideration.

Moreover, in the second embodiment, the magnetic-field adding unit 24c adds the first magnetic field calculated by the first magnetic-field calculating unit 24a and the second magnetic field calculated by the second magnetic-field calculating unit 24b and determines the sum to be the magnetic field of the target device. Therefore, the magnetic-field analysis is made with both the magnetic fields due to the current vectors and the magnetic fields due to the magnetization vectors being taken into consideration.

Results of analyses that are made using the numerical analytical approach according to the present embodiment are described below. These results are obtained when the model of the target device illustrated in FIG. 4 is analyzed in accordance with the analysis conditions illustrated in FIGS. 5A, 5B, and 5C. Because the present analyses are made under the condition that both the elements A and B are in stop, each of the elements A and B has the motion conditions that include the default coordinates X0=(0, 0, 0) and the velocity V=(0, 0, 0).

Figure 7:
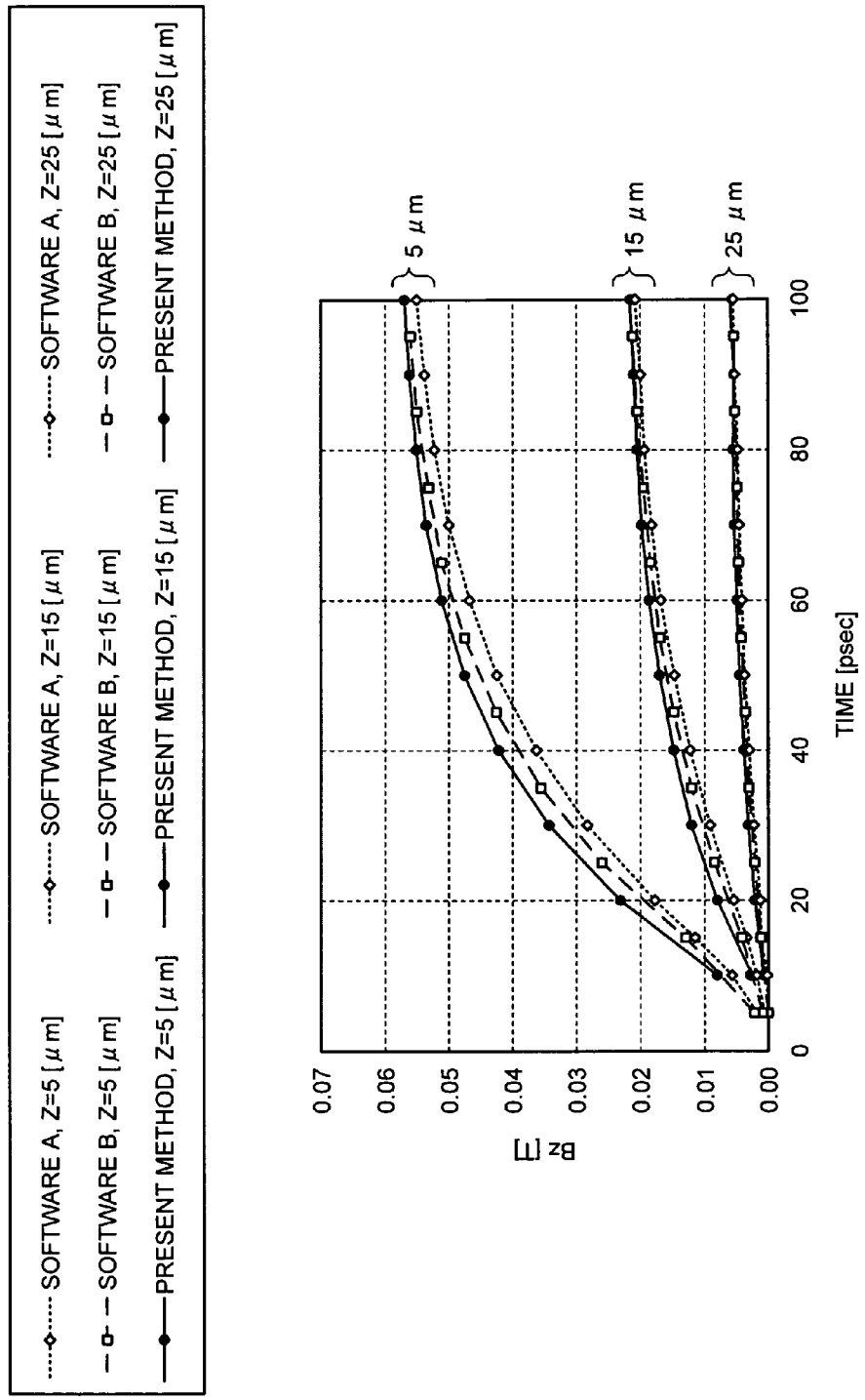
FIG. 7 is a graph of analysis results.

The analysis results illustrated in FIG. 7 include not only the analysis results according to the numerical analytical approach used in the present embodiment but also the analysis results according to pieces of software A and B that are well-known magnetic-field analysis software using the finite-element method. FIG. 7 is a graph of the analysis results. The pieces of the software A and B are the numerical analyses using the finite element method and need to divide the interspaces into meshes. Therefore, when compared with the numerical analytical method according to the present embodiment, the well-known numerical analyses need a longer time to obtain the analysis results.

In the present analyses, as illustrated in FIG. 7, the Z component (Bz) of the magnetic flux density vector is calculated with respect to time at different positions where Z of the element A=5 μm, 15 μm, and 25 μm. The vertical axis of the graph is the Z component (Bz) of the magnetic flux density vector; the horizontal axis is the time.

It is clear from the graph illustrated in FIG. 7 that the analysis results according to the present method are substantially identical at any positions to the analysis results according to the software A and the software B. Therefore, it can be said that the highly accurate analysis is made in a short time by using the numerical analytical approach according to the present embodiment.

[c] Third Embodiment

The first embodiment and the second embodiment are described above. However, the present invention can be implemented variously without being limited to the first embodiment and the second embodiment. Various modifications are described in the following sections (1) to (3).

(1) Model of the Target to be Analyzed and Analysis Conditions

In the first and the second embodiments, as described above, the model of the target to be analyzed and the analysis conditions are specified at the beginning of the analysis. However, the configuration is not limited thereto. For example, it is possible to change the analysis conditions during the analysis.

(2) System configuration, etc.

The processes, the specific names, various data, and information including parameters described in the above embodiments can be changed as appropriately unless otherwise specified. For example, in the present embodiment, the model of the target to be analyzed stored in the model-data storage unit 31 and the analysis condition data stored in the analysis-condition-data storage unit 32 can be updated or new data can be added to the model-data storage unit 31 or the analysis-condition-data storage unit 32 as appropriately.

The constituent elements of the device illustrated in the drawings are merely conceptual, and need not be physically configured as illustrated. The processing units and the storage units can be separated or integrated in a manner different from the above-described manner (see, for example, FIG. 2). For example, the first simultaneous-equation creating unit 22a and the second simultaneous-equation creating unit 22b can be formed as one unit. The process functions performed by the device are entirely or partially implemented by a CPU or computer programs that are analyzed and executed by the CPU, or implemented as hardware by wired logic.

(3) Magnetic-Field Analyzing Program

Figure 8:
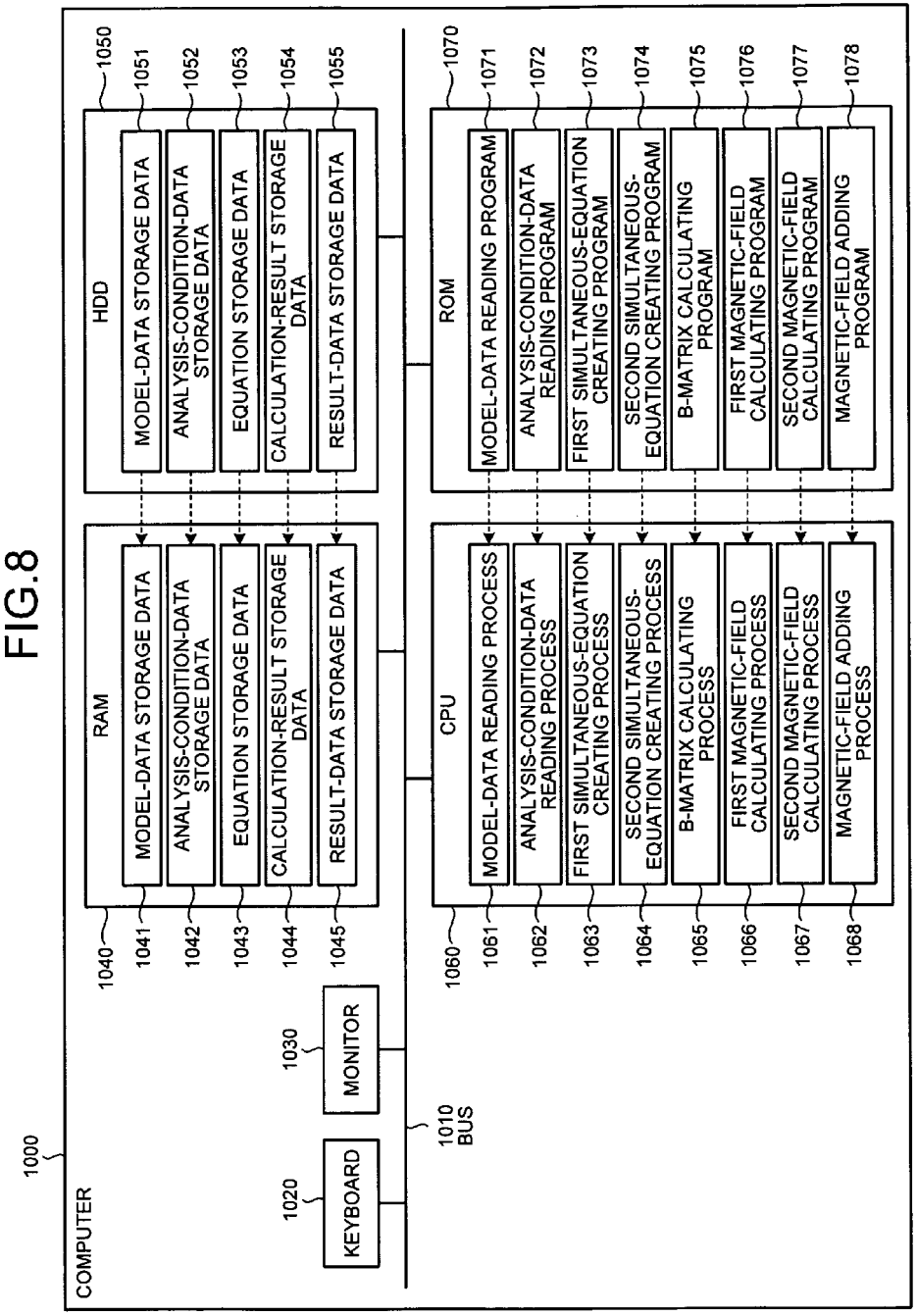
FIG. 8 is a block diagram of a computer that executes magnetic-field analyzing programs according to the second embodiment.

Although, as described above in the second embodiment, the processes are performed by the hardware logic, the configuration is not limited thereto and the processes can be performed when a computer executes predetermined programs. A computer is described below with reference to FIG. 8 that implements the functions of the magnetic-field analyzing apparatus 10 according to the second embodiment when the computer executes magnetic-field analyzing programs. FIG. 8 is a block diagram of the computer that executes the magnetic-field analyzing programs according to the second embodiment.

As illustrated in FIG. 8, a computer 1000 is an information processing apparatus and includes a keyboard 1020, a monitor 1030, a RAM 1040, an HDD 1050, a CPU 1060, and a ROM 1070. The keyboard 1020, the monitor 1030, the RAM 1040, the HDD 1050, the CPU 1060, and the ROM 1070 are connected to each other via a bus 1010 or similar. Although not illustrated, the computer 1000 is connected to a decoder via a network.

The ROM 1070 stores therein, in advance, the magnetic-field analyzing programs that allow the computer to implement the functions of the magnetic-field analyzing apparatus 10. The magnetic-field analyzing programs include, as illustrated in FIG. 8, a model-data reading program 1071, an analysis-condition-data reading program 1072, a first simultaneous-equation creating program 1073, a second simultaneous-equation creating program 1074, a B-matrix calculating program 1075, a first magnetic-field calculating program 1076, a second magnetic-field calculating program 1077, and a magnetic-field adding program 1078. These computer programs 1071 to 1078 can be integrated or separated in another manner as the units of the magnetic-field analyzing apparatus 10 illustrated in FIG. 2 can be separated or integrated.

When the CPU 1060 reads these computer programs 1071 to 1078 from the ROM 1070 and executes these computer programs 1071 to 1078, as illustrated in FIG. 8, a model-data reading process 1061, an analysis-condition-data reading process 1062, a first simultaneous-equation creating process 1063, a second simultaneous-equation creating process 1064, a B-matrix calculating process 1065, a first magnetic-field calculating process 1066, a second magnetic-field calculating process 1067, and a magnetic-field adding process 1068 are ready to start. The processes 1061 to 1068 correspond to the model-data reading unit 21a, the analysis-condition-data reading unit 21b, the first simultaneous-equation creating unit 22a, the second simultaneous-equation creating unit 22b, the B-matrix calculating unit 23, the first magnetic-field calculating unit 24a, the second magnetic-field calculating unit 24b, and the magnetic-field adding unit 24c illustrated in FIG. 2, respectively.

As illustrated in FIG. 8, the HDD 1050 includes model-data storage data 1051, analysis-condition-data storage data 1052, equation storage data 1053, calculation-result storage data 1054, and result-data storage data 1055. The model-data storage data 1051, the analysis-condition-data storage data 1052, the equation storage data 1053, the calculation-result storage data 1054, and the result-data storage data 1055 correspond to the model-data storage unit 31, the analysis-condition-data storage unit 32, the equation storage unit 33, the calculation-result storage unit 34, and the result-data storage unit 35 illustrated in FIG. 2, respectively. The CPU 1060 registers model-data storage data 1041, analysis-condition-data storage data 1042, equation storage data 1043, calculation-result storage data 1044, and result-data storage data 1045 to the model-data storage data 1051, the analysis-condition-data storage data 1052, the equation storage data 1053, the calculation-result storage data 1054, and the result-data storage data 1055, respectively, reads the model-data storage data 1041, the analysis-condition-data storage data 1042, the equation storage data 1043, the calculation-result storage data 1044, and the result-data storage data 1045, and stores the read data in the RAM 1040. The CPU 1060 performs the magnetic-field analyzing process using the model-data storage data 1041, the analysis-condition-data storage data 1042, the equation storage data 1043, the calculation-result storage data 1044, and the result-data storage data 1045 present in the RAM 1040.

The described-above computer programs 1071 to 1078 do not need to be present in the ROM 1070 by default. For example, these computer programs can be stored in a "portable physical medium" insertable to the computer 1000, such as a flexible disk (FD), a CD-ROM, an MO disk, a DVD disk, a magnetic optical disk, or an IC card, a "stationary physical medium" such as an internal or external HDD of the computer 1000, or "another computer (or server)" that is connected to the computer 1000 via the public line, the Internet, a LAN, a WAN, or the like. The computer 1000 reads the computer programs from the recording medium and executes the read computer programs.

The apparatus disclosed herein can analyze a magnetic field accurately with the effects of magnetization vectors upon the magnetic field being taken into consideration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A magnetic-field analyzing apparatus comprising:
an input unit that receives physical property data of and position information of elements included in a target to be analyzed;
an equation creating unit that creates,
using the physical property data received from the input unit,
a first equation for calculating a first magnetic field due to a current vector in the target to be analyzed and a second equation for calculating a second magnetic field due to a magnetization vector in the target to be analyzed, the first equation being created by including therein terms concerning the current vector but a term concerning the magnetization vector, and the second equation being created in a form of Poisson's equation whose unknown is a vector potential of the second magnetic field, and creates,
by applying a finite element method and a boundary integral method and applying in accordance with change over time of relative positions between the elements included in the target to be analyzed an implicit method to the first equation and the second equation,
a first set of simultaneous equations for calculating a time-series value of the first magnetic field and a second set of simultaneous equations for calculating a time-series value of the second magnetic field, respectively; and
a magnetic-field calculating unit that calculates the first magnetic field and the second magnetic field using the first set of simultaneous equations and the second set of simultaneous equations, respectively, created by the equation creating unit, and adds the calculated first magnetic field and the calculated second magnetic field to obtain a sum thereof as magnetic field of the target.

2. A non-transitory computer readable storage medium having stored therein a magnetic-field analyzing program, the magnetic-field analyzing program causing a computer to execute a process comprising:
receiving physical property data of and position information of elements included in a target to be analyzed;
creating,
using the received physical property data,
a first equation for calculating a first magnetic field due to a current vector in the target to be analyzed and a second equation for calculating a second magnetic field due to a magnetization vector in the target to be analyzed, the first equation being created by including therein terms concerning the current vector but a term concerning the magnetization vector, and the second equation being created in a form of Poisson's equation whose unknown is a vector potential of the second magnetic field, and, by applying a finite element method and a boundary integral method and applying in accordance with change over time of relative positions between the elements included in the target to be analyzed an implicit method to the first equation and the second equation, a first set of simultaneous equations for calculating a time-series value of the first magnetic field and a second set of simultaneous equations for calculating a time-series value of the second magnetic field, respectively; and calculating the first magnetic field and the second magnetic field using the created first set of simultaneous equations and second set of simultaneous equations, respectively, and adding the calculated first magnetic field and the calculated second magnetic field to obtain a sum thereof as magnetic field of the target.

* * * * *